(12) United States Patent
Mazumdar et al.

(10) Patent No.: US 9,575,479 B2
(45) Date of Patent: Feb. 21, 2017

(54) SYSTEM AND METHOD FOR SEALING A SYNGAS COOLER

(71) Applicant: General Electric Company, Schenectady, NY (US)

(72) Inventors: Anindra Mazumdar, Houston, TX (US); Jay Christopher Schleicher, Houston, TX (US); Atul Kumar Vij, Bangalore (IN); Uma Chinnadurai, Bangalore (IN); Paromita Bhattacharya, Bangalore (IN); Rajeshwar Sripada, Bangalore (IN)

(73) Assignee: General Electric Company, Schenectady, NY (US)

( * ) Notice: Subject to any disclaimer, the term of this patent is extended or adjusted under 35 U.S.C. 154(b) by 274 days.

(21) Appl. No.: 14/091,791

(22) Filed: Nov. 27, 2013

(65) Prior Publication Data

US 2015/0148434 A1 May 28, 2015

(51) Int. Cl.
*B01J 7/00* (2006.01)
*G05B 15/02* (2006.01)
*F16J 15/14* (2006.01)
*C01B 31/18* (2006.01)
*C01B 3/00* (2006.01)
*C01B 31/20* (2006.01)

(52) U.S. Cl.
CPC .......... *G05B 15/02* (2013.01); *C01B 3/00* (2013.01); *C01B 31/18* (2013.01); *C01B 31/20* (2013.01); *F16J 15/14* (2013.01); *C01B 2203/0283* (2013.01); *C01B 2203/0415* (2013.01); *C01B 2203/0485* (2013.01); *C01B 2203/0883* (2013.01); *Y02E 20/16* (2013.01); *Y02P 20/13* (2015.11)

(58) Field of Classification Search
CPC ................................................ F28D 2021/0075
See application file for complete search history.

(56) References Cited

U.S. PATENT DOCUMENTS

| | | | | |
|---|---|---|---|---|
| 4,087,497 A * | 5/1978 | Opitz | ........................ | F23J 15/06 208/48 Q |
| 5,794,688 A * | 8/1998 | Heering | .................. | F28F 19/02 165/134.1 |
| 6,155,337 A * | 12/2000 | Rosengarten | ........... | F28F 19/02 165/133 |
| 2007/0119577 A1* | 5/2007 | Kraft | .......................... | C10J 3/84 165/157 |
| 2010/0288474 A1 | 11/2010 | Dinu et al. | | |
| 2011/0034745 A1* | 2/2011 | Raybold | ................... | C01B 3/38 585/310 |
| 2011/0072720 A1 | 3/2011 | Abbasi et al. | | |
| 2011/0301252 A1* | 12/2011 | Ostuni | ................ | C07C 29/1518 518/702 |
| 2012/0273175 A1 | 11/2012 | Blanchard et al. | | |

* cited by examiner

*Primary Examiner* — Imran Akram
(74) *Attorney, Agent, or Firm* — Fletcher Yoder, P.C.

(57) ABSTRACT

A system includes a syngas cooler and a compatible seal gas system. The syngas cooler may be configured to cool a syngas. The compatible seal gas system may be configured to supply a compatible seal gas to a seal of the syngas cooler. The seal may be configured to block the syngas from a passage between an outer wall of the syngas cooler and a tube cage of the syngas cooler.

11 Claims, 7 Drawing Sheets

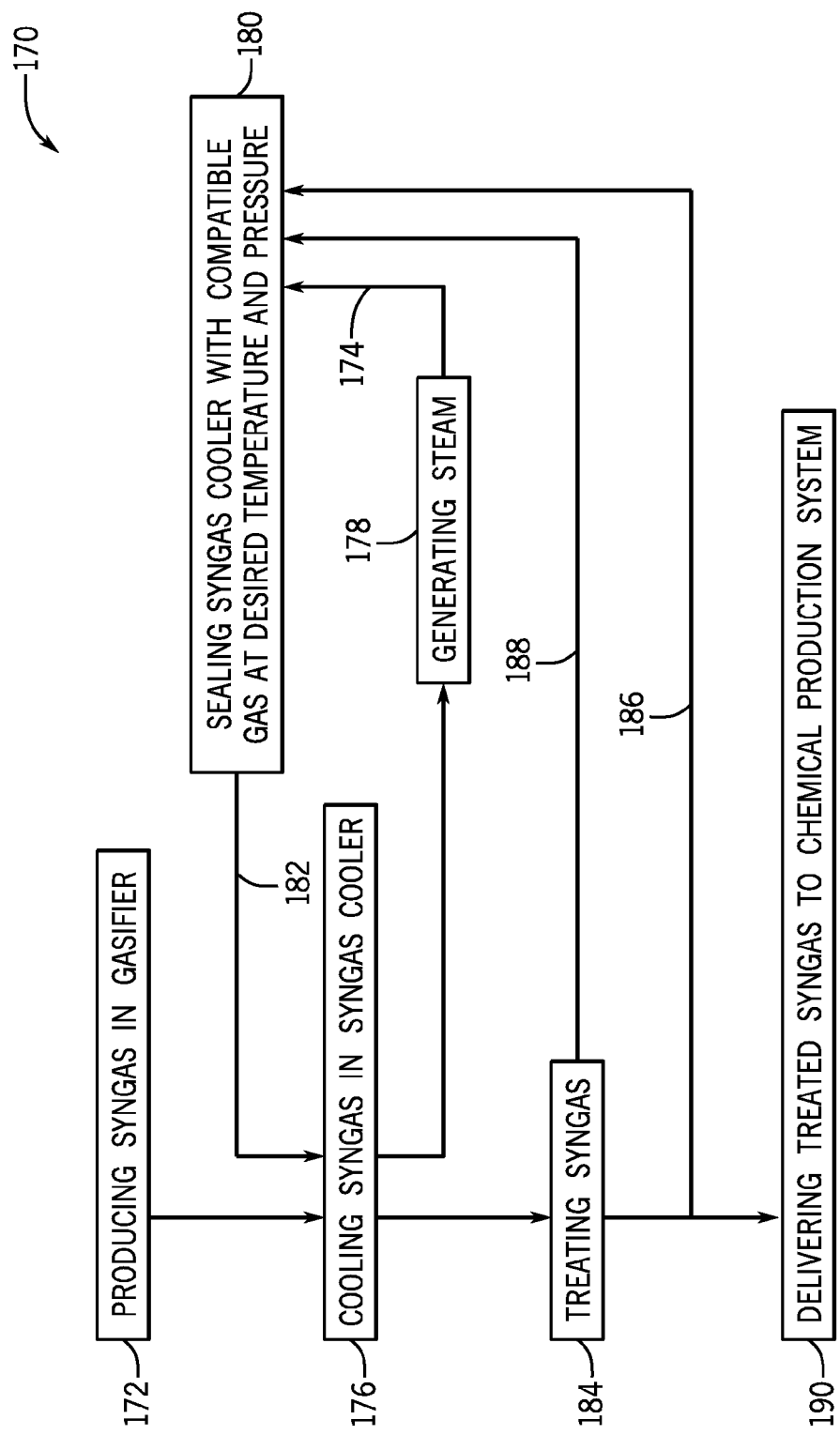

SYSTEM AND METHOD FOR SEALING A SYNGAS COOLER

BACKGROUND

The subject matter disclosed herein relates generally to gasification systems, and more particularly to systems and methods for sealing a syngas cooler.

Gasification systems may be used to generate a gas mixture of carbon monoxide (CO) and hydrogen ($H_2$), e.g., synthesis gas, or syngas, by reacting various hydrocarbon feedstock, such as coal, with steam and oxygen ($O_2$) in a gasifier. The syngas may be processed and utilized in chemical production applications or as fuel in a combined cycle power plant. The gasification process generally takes place at relatively high pressures and temperatures. Cooling the hot syngas may be desirable, for example, to aid in maintaining the stability of the syngas as the syngas is distributed for use in chemical production applications or in combined cycle power plants.

A syngas cooler may be used to cool the syngas produced by the gasifier. Syngas produced by the gasifier may also contain corrosive gases, such as hydrogen sulfide ($H_2S$) and carbonyl sulfide (COS).

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a syngas cooler configured to cool a syngas. The syngas cooler includes a seal configured to block the syngas from a passage between an outer wall of the syngas cooler and a tube cage of the syngas cooler. The system also includes a compatible seal gas system configured to supply a compatible seal gas to the seal of the syngas cooler.

In a second embodiment, a method includes blocking a syngas from entering a passage between an outer wall of a syngas cooler and a tube cage of the syngas cooler using a seal disposed in the syngas cooler, and supplying a compatible seal gas to the seal using a compatible seal gas system.

In a third embodiment, a system includes a controller including one or more tangible, non-transitory, machine-readable media collectively storing one or more sets of instructions. The controller also includes one or more processing devices configured to execute the one or more sets of instructions to control a syngas cooler to cool a syngas and to block the syngas from entering a passage between an outer wall of the syngas cooler and a tube cage of the syngas cooler using a seal disposed in the syngas cooler, and to control a compatible seal gas system to supply a compatible seal gas to the seal.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 7 is a process flow diagram of an embodiment of a method for providing a compatible seal gas to a syngas cooler.

DETAILED DESCRIPTION

Figure 1:
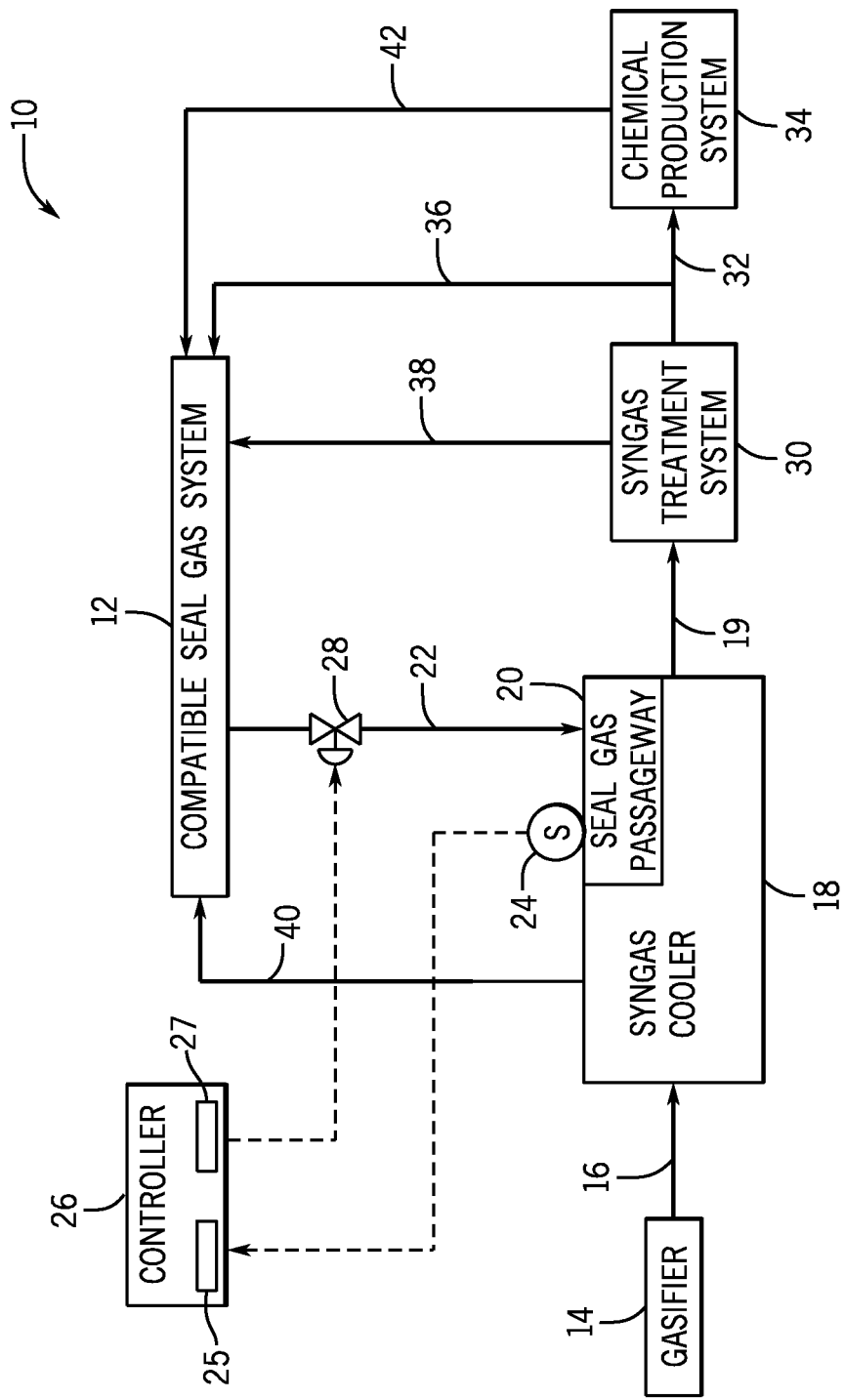
FIG. 1 is a block diagram of an embodiment of a gasification system incorporating a compatible seal gas system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

A gasification system in accordance with the present disclosure may include a gasifier configured to generate a synthesis gas, or syngas, and a syngas cooler (e.g., a radiant syngas cooler, or RSC, or a convective syngas cooler, or CSC) configured to cool the syngas. Coming out from the gasifier, the hot syngas enters an enclosure region (e.g., tube cage) within the syngas cooler to be cooled. The tube cage confines the hot syngas path and includes tubes filled with cooling fluids. The syngas cooler extracts heat from the syngas by heat exchange between the hot syngas and the fluid-cooled tubes within the tube cage. An annulus may exist between the tube cage and the outer wall (e.g., shell) of the syngas cooler. This annulus may be purged with a seal gas to block or reduce syngas accumulation in this area, which could result in corrosion because the syngas may contain corrosive gases, such as hydrogen sulfide ($H_2S$) and carbonyl sulfide (COS). The seal gas may be selected so as not to interact with (e.g., corrode) the materials used in the manufacture or construction of the syngas cooler. The seal gas flows through the annulus and may mix with the syngas as the syngas flows out of the syngas cooler before being transferred to a downstream system (e.g., a syngas treatment system, a chemical production system, or a combined cycle power plant). While nitrogen may be used as the syngas cooler seal gas in certain seal gas systems, nitrogen may be an impurity for certain syngas applications, such as chemical production applications. For example, nitrogen is an impurity when using the syngas to produce methanol, and extra cost would be spent in purifying the syngas to remove nitrogen. Therefore, it may be desirable to use compatible gases (e.g., gases that are not impurities and/or do not affect operation of a downstream system) as the syngas cooler seal gas to reduce or eliminate impurities in the syngas for downstream chemical production applications. In other words, the compatible seal gas is non-corrosive or corrosion resistant seal gas that is compatible with the downstream system without removal of the seal gas from the syngas for the downstream applications. For example, the compatible seal gas may be a non-nitrogen gas (e.g., gas that does not contain nitrogen).

Accordingly, the present disclosure provides a compatible seal gas system to supply a compatible seal gas for the syngas cooler. In some embodiments, the syngas coming out of the syngas cooler may be treated by a syngas treatment system to remove corrosive gases in the syngas. A portion of the treated syngas may be processed to a desired pressure and temperature before being supplied to the syngas cooler as the seal gas. In other embodiments, a byproduct, such as carbon dioxide, of the syngas treatment system may be used as the seal gas for the syngas cooler. In further embodiments, steam generated by the syngas cooler due to heat exchange between the syngas and the fluid-cooled tubes, and/or by some units integrated into and/or independent of the gasification system (e.g., a boiler, a steam drum, a steam turbine, a heat recovery steam generator (HRSG), or any combination thereof), may also be directed back to the syngas cooler as the seal gas. Other examples of compatible seal gas may include carbon monoxide (CO), hydrogen ($H_2$), or gases produced by the chemical production system, or any combination thereof.

With the forgoing in mind, FIG. 1 depicts a block diagram of an embodiment of a gasification system 10 incorporating a compatible seal gas system 12. The gasification system 10 may include a gasifier 14, where a carbonaceous fuel source may react with oxygen and some additives, such as water, to produce syngas via a series of reactions, collectively referred to as a gasification process. The fuel source may include coal, petroleum coke, biomass, wood-based materials, agricultural wastes, tars, and asphalt, or other carbon containing materials. During the gasification process, the fuel source may react with a limited amount of oxygen at elevated pressures (e.g., from absolute pressures of approximately 20 bar to 85 bar) and temperatures (e.g., approximately 700° C. to 1600° C.) to produce syngas 16. The syngas 16 may include hydrogen and carbon monoxide. Other less desirable components may also be formed, including carbon dioxide, particulates, ashes, and acid gases, such as hydrogen sulfide ($H_2S$) and carbonyl sulfide (COS).

In the depicted embodiment of FIG. 1, the gasifier 14 is configured to discharge the syngas 16 into a syngas cooler 18. As discussed in more detail below, as the syngas 16 flows through the syngas cooler 18, it may be cooled down by exchanging heat with fluid-cooled surfaces (e.g., tubes) within a tube cage of the syngas cooler 18. The tube cage is an enclosure within the syngas cooler 18 that confines the syngas path. An annulus may exist between the tube cage and the outer wall (e.g., shell) of the syngas cooler 18. As noted above, the syngas 16 may contain acid gases, such as hydrogen sulfide ($H_2S$) and carbonyl sulfide (COS), which are corrosive and may negatively affect the tube cage or other parts of the syngas cooler 18 if they migrate into the annulus. To reduce or eliminate such negative effects (e.g., corrosion), the annulus may be purged with a seal gas, thereby forming a seal gas passageway 20 to block or reduce syngas accumulation in the annulus. As noted above, the seal gas (e.g., non-corrosive, downstream system compatible seal gas) may be selected so as not to interact with (e.g., corrode) the materials used in the manufacture or construction of the syngas cooler 18. In the depicted embodiment of FIG. 1, the seal gas may be a compatible gas supplied by the compatible seal gas system 12 via a flow line 22 coupling the compatible seal gas system 12 and the seal gas passageway 20.

The gasification system 10 may include one or more sensors 24 used to monitor various parameters (e.g., temperature, pressure, flow rate, gas composition, or concentration, etc.) of gas and/or liquid flows throughout the gasification system 10. The one or more sensors 24 may include a temperature sensor, a pressure sensor, a flow rate sensor, a bubble sensor, a moisture sensor, a gas composition sensor, or any combination thereof. The one or more sensors 24 may be located inside, adjacent to, or in flow communication with the seal gas passageway 20 to monitor parameters (e.g., temperature, pressure, flow rate, gas composition, or concentration, etc.) of the seal gas within the seal gas passageway 20. In some embodiments, the one or more sensors 24 may be located outside the seal gas passageway 20, e.g., on the flow line 22 coupling the compatible seal gas system 12 and the syngas cooler 18.

A controller 26 may process sensor feedback received from the one or more sensors 24 and may send control signals to a valve 28 located on the flow line 22 based on the sensor feedback. The controller 26 may include a distributed control system (DCS) or any computer-based workstation that is fully or partially automated. For example, the controller 26 may be any device employing a general purpose or an application-specific processor 25, both of which may generally include memory circuitry 27 for storing instructions related to pressure differentials and flow rates, for example. The processor 25 may include one or more processing devices, and the memory circuitry 27 may include one or more tangible, non-transitory (i.e., not signals), machine-readable media collectively storing instructions executable by the processor to perform the methods and control actions described herein. Such machine-readable media can be any available media that can be accessed by the processor or by any general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by the processor or by any general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause the processor or any general purpose computer, special purpose computer, or special purpose processing machines to perform a certain function or group of functions. In certain embodiments, the gasification system 10 may include one or more sensors and valves at various locations of the system 10, and one or more controllers 26 coupling these sensors and valves may govern operation of the gasification system 10 including gasification, syngas cooling, seal gas supply, syngas treatment, and chemical production applications.

Coming out of the syngas cooler 18, an untreated and cooled syngas 19 may be transferred to a syngas treatment system 30 where the syngas 19 may be treated to remove impurities, such as carbon dioxide, particulates, and acid gases. For example, the syngas treatment system 30 may include various units, such as a scrubber, a shift reactor, a low temperature gas cooling (LTGC) train, and/or an acid gas removal (AGR) unit. The syngas scrubber may remove undesirable particulates from the untreated syngas 19. The scrubbed syngas from the syngas scrubber is relatively cleaned of ash and soot. The scrubbed syngas may enter the shift reactor where a syngas shift reaction occurs in which carbon monoxide and water react to form carbon dioxide and hydrogen. As such, the hydrogen content of the syngas may increase. The LTGC train may include a feed/product heat exchanger to further cool the syngas. The syngas may also undergo absorption treatment by one or more suitable solvents in the AGR unit where acid gases, such as hydrogen sulfide ($H_2S$) and carbonyl sulfide (COS), may be removed from the syngas. The AGR unit may also include a carbon capture system and thereby separates carbon dioxide from the syngas. In certain embodiments, some units of the syngas treatment system 30 may be arranged in different orders, and some units of the syngas treatment system 30 may be modified, excluded, or additional units may be included.

Exiting the syngas treatment system 30, a treated syngas 32 may enter a chemical production system 34 where the treated syngas 32 may be used to produce any of a variety of chemicals, such as methanol, ammonia, hydrogen, or acetic acid. As noted above, nitrogen, if used as the seal gas for the syngas cooler, may exit the syngas cooler together with the syngas and thereby may constitute an impurity of the syngas for chemical production applications. In accordance with the present disclosure, compatible gas may be used as the syngas cooler seal gas, thereby eliminating or reducing the removal of impurities for chemical production applications of the syngas.

As discussed in more detail below, various sources of compatible gas may be provided to the compatible seal gas system 12. In some embodiments, a portion of the treated syngas 32 (e.g., after acid gas removal) may be provided via a flow line 36 to the compatible seal gas system 12 to be used as the syngas cooler seal gas. In other embodiments, some gases coming out of the syngas treatment system 30 (e.g., after acid gas removal) via a flow line 38 while the syngas is being treated may also be used as the syngas cooler seal gas, such as the pre-AGR syngas, and carbon dioxide from the AGR. In certain embodiments, a portion of steam generated by the syngas cooler 18 due to heat transfer may be provided to the compatible seal gas system 12 via a flow line 40 and directed back to the syngas cooler to be used as the seal gas. In further embodiments, a portion of the gas produced by the chemical production system 34 (e.g., without acid gases) may be provided via a flow line 42 to the compatible seal gas system 12 to be used as the syngas cooler seal gas.

Figure 2:
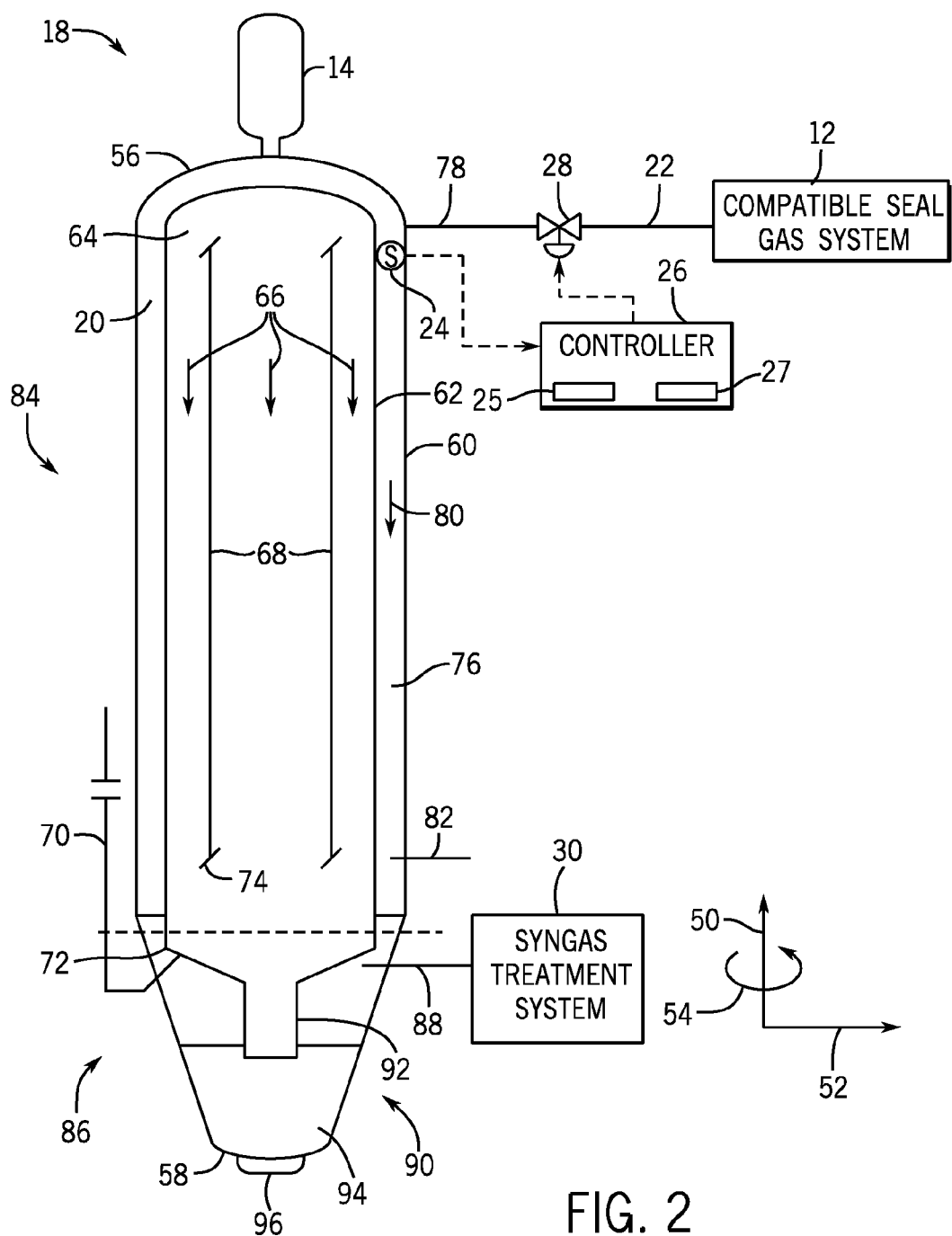
FIG. 2 is a cross-sectional view of an embodiment of a radiant syngas cooler (RSC) coupled with a compatible seal gas system.

FIG. 2 is a cross-sectional view of an embodiment of the syngas cooler 18 (e.g., a RSC) that may be used with the gasification system 10 of FIG. 1. The RSC 18 may have an axial axis 50, a radial axis 52, and a circumferential axis 54. Additionally, the RSC 18 may have a first end 56 (e.g., a top end) and a second end 58 (e.g., a bottom end). As noted above, the syngas 16 generated in the gasifier 14 may include particulates from the gasification process, and the syngas 16 and/or the particulates may be directed into the RSC 18. The RSC 18 may be configured to cool the syngas 16 prior to transferring the syngas 16 to the syngas treatment system 30, and further downstream to the chemical production system 34. The terms downstream and upstream are defined with respect to a main syngas flow path (e.g., between systems, or within a system), such that the RSC 18 is upstream from the chemical production system 34, and the bottom end 58 of the RSC 18 is downstream from the top end 56 of the RSC 18.

In certain embodiments, the RSC 18 may include a shell 60 (e.g., outer wall) that is generally configured to protect and/or to support various components within the RSC 18. The shell 60 (e.g., hollow annular enclosure) may have a substantially circular cross-sectional shape on the plane defined by the radial axis 52 and the circumferential axis 54, although any shape or form suitable for facilitating cooling of the syngas 16 may be utilized.

A heat exchange wall 62 (e.g., heat exchange structure, interior wall, membrane, or tube cage wall) may be positioned within the shell 60, and the heat exchange wall 62 may define a central cavity 64 (e.g., tube cage) through which the syngas 16 flows along a main syngas flow path 66 directed from the top end 56 to the bottom end 58. The RSC 18 may include one or more (e.g., about 1, 4, 8, 12, 16, 20, 24, 28, 32, or more) heat exchange elements 68, positioned within the central cavity 64 and configured to absorb heat from the syngas 16 as the syngas 16 flows along the main syngas flow path 66. In some embodiments, a liquid coolant (e.g., water) may be delivered via one or more conduits 70 to the heat exchange wall 62 and/or to the heat exchange elements 68 to facilitate cooling of the syngas 16 as the syngas 16 flows along the main syngas flow path 66. In some embodiments, the liquid coolant is delivered via the one or more conduits 70 to a header 72 (e.g., a bottom header) of the heat exchange wall 62 and/or to a header 74 (e.g., a bottom header) of the heat exchange elements 68. Due to the heat exchange between the liquid coolant and the hot syngas 16, steam may be generated. In some embodiments, steam may be transferred out of the RSC 18 via one or more valves, and then delivered to other parts of the gasification for reuse, such as the compatible seal gas system 12.

The heat exchange wall 62 may be configured to substantially isolate the shell 60 from the syngas 16 and/or particulates flowing along the main syngas flow path 66. Additionally, the annular passageway 20 may extend between or may be defined by the heat exchange wall 62 and the shell 60. A seal gas 76 (e.g., a compatible seal gas, or a non-corrosive or corrosion resistant seal gas that is not an impurity and/or does not affect operation of a downstream system) may be provided or delivered into the annular passageway 20 via a gas inlet 78 (e.g., the gas inlet 78 may be coupled to the annular passageway 20). As discussed in detail below, the compatible seal gas may be partially treated syngas (e.g., shift reacted syngas with acid gases), treated syngas (e.g., syngas without acid gases, process gas without acid gases), carbon dioxide, steam, natural gas, blast furnace gas, product gas produced by the chemical production system, or a combination thereof. The compatible seal gas may be supplied to the annular passageway 20 by the compatible gas system 12. As illustrated, within the annular passageway 20, the seal gas 76 may flow along a seal gas path 80 and exit the annular passageway 20 via a gas outlet 82 (e.g., the gas outlet 82 may be coupled to the annular passageway 20) located downstream of the gas inlet 78. The parameters of the seal gas 76 within the annular passageway 20, such as temperature, pressure, flow rate, gas composition, or concentration may be monitored by the sensor 24 along the seal gas path 80. In some embodiments, the sensor 24 may be located outside the RSC 18, e.g., near the seal gas inlet 78. The controller 26 may process sensor feedback received from the sensor 24 and may send control signals to the valve 28 located on the flow line 22 based on the sensor feedback. For example, if the sensor feedback received from the sensor 24 indicates that more seal gas should be added, the controller 26 sends an output signal to the valve 28 to open it further, allowing more seal gas to flow into the annular passageway 29. Similarly, if the sensor feedback received from the sensor 24 indicates that less seal gas should be added, the controller 26 sends an output signal to the valve 28 to partially close it down, allowing less seal gas to flow into the annular passageway 29.

The heat exchange wall 62, the central cavity 64, and/or the heat exchange elements 68 may be part of or may define a first region 84 (e.g., an upper region or a heat exchange region) that is generally upstream of a second region 86 (e.g., a lower region or a quenching region) of the RSC 18. Thus, the syngas 16 and/or particulates may flow along the main syngas flow path 66 within the heat exchange region 84 toward the quenching region 86 of the RSC 18.

The quenching region 86 may have a quench chamber 90 configured to further cool the syngas 16 and/or remove particulates from the syngas 16. As illustrated, a dip tube 92 may extend from the heat exchange region 84 toward the quench chamber 90. The dip tube 92 may also take any form suitable for facilitating cooling of the syngas 16 and/or for directing the syngas 16 toward the quench chamber 90. The quench chamber 90 may include a bath 94 (e.g., a water bath) having a liquid coolant, such as water, although any suitable liquid (e.g., non-reactive liquid) for quenching the syngas 16 may be utilized. In some embodiments, a lower end of the dip tube 92 may extend into the liquid coolant to facilitate flow of the syngas 16 into the liquid coolant. The syngas 16 may be cooled through contact with the liquid coolant in the bath 94, and may then pass out of the liquid coolant and toward a syngas outlet 88. Although one syngas outlet 88 is shown, multiple syngas outlets 88 may be provided in some embodiments. Additionally, the quench chamber 90 may facilitate scrubbing of the syngas 16, and particulates in the syngas 16 may be directed toward a particulate outlet 96, where they are discharged.

As noted above, the seal gas may be transferred out of the annular passageway 20 via the seal gas outlet 82. It should be noted, however, the seal gas may also migrate into the quench chamber 90 and thereby mix with the cooled syngas and be transferred out of the RSC 18 via the syngas outlet 88. Accordingly, without the disclosed embodiments, the seal gas may constitute an impurity of the cooled syngas and be transferred to downstream systems. For example, in certain seal gas systems, nitrogen is used as the seal gas for the RSC 18, and the cooled syngas coming out of the RSC 18 may contain nitrogen gas. For a downstream chemical production system that uses the syngas to produce methanol, ammonia, or hydrogen, nitrogen may constitute an undesirable impurity. Therefore, in the disclosed embodiments, a compatible gas may be used as the seal gas for the RSC in order to eliminate or reduce introducing impurities from seal gas to the downstream chemical production applications of the syngas.

In accordance with the present disclosure, FIGS. 3-6 illustrate block diagrams of embodiments of a gasification system incorporating a compatible seal gas system using different compatible gases as the syngas cooler seal gas. Specific features of embodiments depicted in FIGS. 3-6 may be combined, excluded, or modified. For example, in certain embodiments, a compatible seal gas may supply two or more compatible gases as the syngas cooler seal gas.

Figure 3:
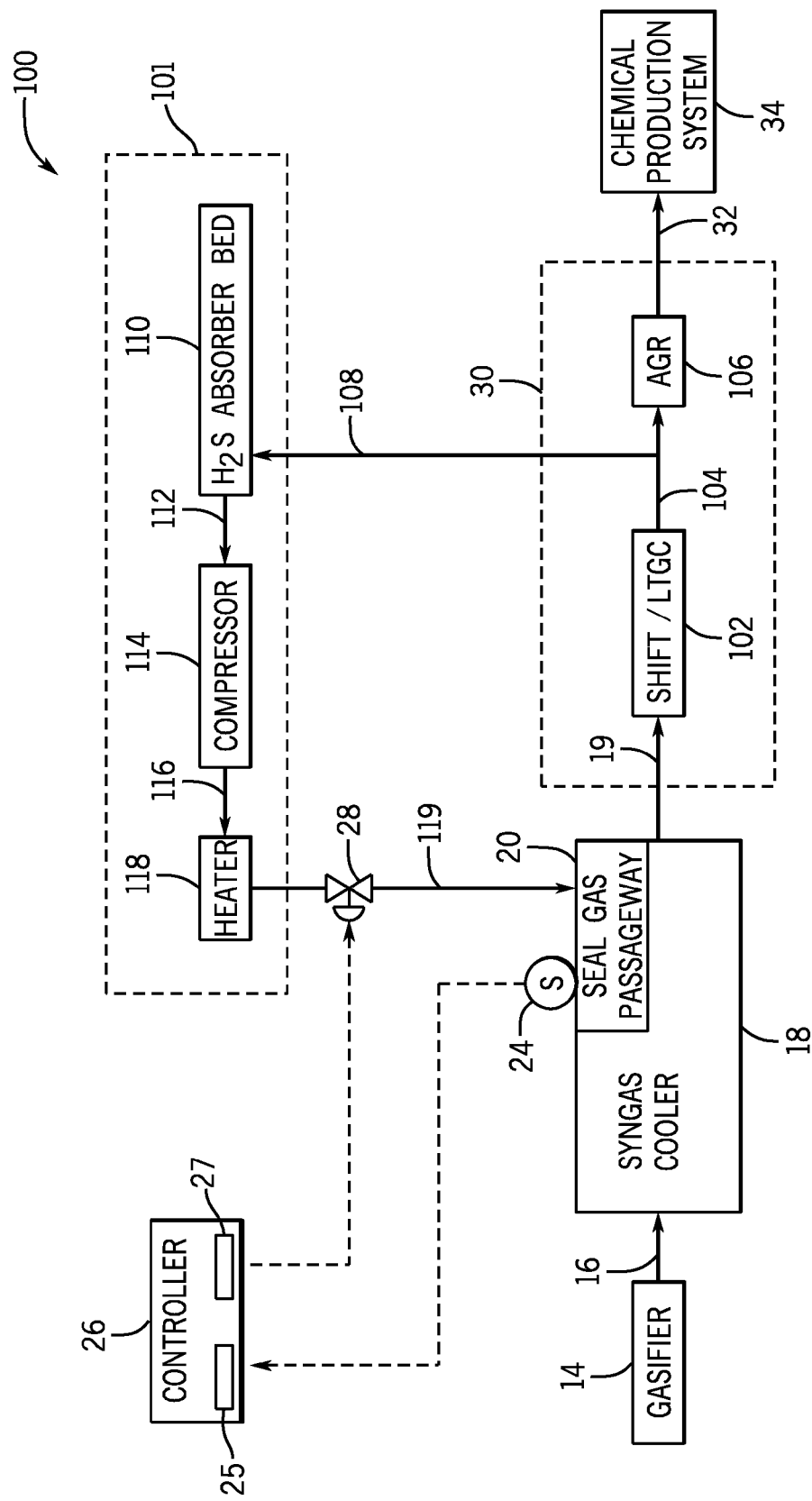
FIG. 3 is a block diagram of an embodiment of a gasification system incorporating a compatible seal gas system to supply pre-AGR syngas as a seal gas.

FIG. 3 is a block diagram of an embodiment of a gasification system 100 incorporating a compatible seal gas system 101 using pre-AGR syngas (e.g., syngas obtained upstream of the AGR) as the seal gas for the syngas cooler 18. As the system 100 includes similar components to the system 10 of FIG. 1, the components to the gasification system 100 will be discussed in a similar manner to the gasification system 10 described above with respect to FIG. 1 using the same reference numerals for the same elements.

As described above, the gasifier 14 may produce the syngas 16. The syngas 16 may include hydrogen and carbon monoxide. Other less desirable components may also be included, e.g., carbon dioxide and acid gases, such as hydrogen sulfide ($H_2S$) and carbonyl sulfide (COS). The syngas 16 may be provided to the syngas cooler 18 where the syngas 16 may be cooled and/or quenched to remove particulates.

The cooled syngas 19 may be transferred from the syngas cooler 18 to the syngas treatment system 30. In the depicted embodiment, the syngas treatment system 30 may include a shift/LTGC unit 102 and an AGR unit 106. As discussed above, the shift/LTGC unit 102 may perform a syngas shift reaction in which carbon monoxide and water react to form carbon dioxide and hydrogen, and thereby increasing the hydrogen content of the syngas. The shift/LTGC unit 102 may also include a low temperature gas cooling train where a feed/product heat exchanger may be used to cool the shifted syngas. In certain embodiments, the shift/LTGC unit 102 may be modified to have two separate units, namely, a shift reactor and a LTGC, combined to perform essentially the same functions of the shift/LTGC unit 102.

A shifted/cooled syngas 104 coming out of the shift/LTGC unit 102 may be transferred to the AGR unit 106. The AGR unit 106 may include one or more suitable solvents that may absorb acid gases, such as hydrogen sulfide ($H_2S$) and carbonyl sulfide (COS), contained in the syngas 104. The AGR unit 106 may also include a carbon capture system and thereby separates carbon dioxide from the syngas 104. The treated syngas 32 coming out of the AGR unit 106 may then be transferred to the chemical production system 34, e.g., to produce chemicals, such as methanol, ammonia, hydrogen, or acetic acid. In certain embodiments, additional units may be included in the syngas treatment system 30, and some units in the syngas treatment system 30 may be modified or excluded.

The shifted/cooled syngas 104 coming out of the shift/LTGC unit 102 may also be referred to as a pre-AGR syngas 104. As noted above, because the syngas 104 has not yet been treated by the AGR unit 106, the syngas 104 may contain carbon dioxide and acid gases, such as hydrogen sulfide ($H_2S$) and carbonyl sulfide (COS). A portion of the syngas 104, e.g., a pre-AGR syngas 108, may be provided to the compatible seal system 101 to supply to the syngas cooler 18 as the seal gas.

In the depicted embodiment, the pre-AGR syngas 108 may be transferred to a $H_2S$ absorber bed 110 where hydrogen sulfide ($H_2S$) and carbonyl sulfide (COS) may be removed from the pre-AGR syngas 108. The H2S absorber bed 110 may include one or more physical solvents, chemical solvents, and/or mixed physical/chemical solvents, which bind and/or react with hydrogen sulfide ($H_2S$) and/or carbonyl sulfide (COS) in the pre-AGR syngas 108. Accordingly, a treated pre-AGR syngas 112 coming out of the $H_2S$ absorber bed 110 may include syngas (i.e., hydrogen and carbon monoxide) and carbon dioxide ($CO_2$) with a reduced and/or low concentration of acid gases. For example, the treated pre-AGR syngas 112 may include less than approximately 0.015 ppm, or 0.01 ppm, or 0.005 ppm hydrogen sulfide ($H_2S$). The treated pre-AGR syngas 112 may also include less than approximately 0.015 ppm, or 0.01 ppm, or 0.005 ppm carbonyl sulfide (COS). In some embodiments, the treated pre-AGR syngas 112 may include, in mole fractions, approximately 64-74% syngas, 25-35% carbon dioxide, and 1-2% other gases, such as argon. In certain embodiments, the exact composition of the treated pre-AGR syngas 112 will vary depending on, among other factors, the gasification process, shift reactions, and $H_2S$ absorber bed efficiency.

Before transferring the treated pre-AGR syngas 112 to the seal gas passageway 20 of the syngas cooler 18 for use as the seal gas, the treated pre-AGR syngas 112 may be pressurized and heated. In the depicted embodiment, the treated pre-AGR syngas 112 may be transferred to a compressor 114 to be pressurized. As noted above, inside of the syngas cooler 18, the syngas may migrate into the annular passageway 20, and accordingly, it may be desirable that the seal gas has a greater pressure than the syngas to facilitate in blocking the accumulation of the syngas in the annular passageway 20. For example, a pressurized pre-AGR syngas 116 may have a pressure between approximately 30 to 100 bar, 40 to 90 bar, 50 to 80 bar, or 60 to 70 bar. By further example, the pressurized pre-AGR syngas 116 may have a pressure of approximately 65 bar.

In the depicted embodiment, the pressurized pre-AGR syngas 116 may be transferred to a heater 118 to be heated. To reduce or eliminate the condensation of the seal gas on the outer surface of the tube cage, thereby decreasing the efficiency of the seal gas purging within the annular passageway 20, it may be desirable that the seal gas is heated before entering the annular passageway 20. For example, a heated pre-AGR syngas 119 may have a temperature between approximately 250 to 400° C., 270 to 380° C., 290 to 360° C., or 310 to 330° C. By further example, the heated pre-AGR syngas 119 may have a temperature of approximately 320° C. In some embodiments, the treated pre-AGR syngas 112 may be heated first by the heater 118 before being pressurized by the compressor 114.

The heated and pressurized pre-AGR syngas 119 may then be transferred to the seal gas passageway 20 of the syngas cooler 18 to be used as the seal gas. As discussed above, the sensor 24 may be located inside the seal gas passageway 20 to monitor parameters (e.g., temperature, pressure, flow rate, gas composition, or concentration, etc.) of the seal gas within the seal gas passageway 20. In some embodiments, the sensor 24 may be located outside the seal gas passageway 20, e.g., on the flow line between the compatible seal gas system 101 and the syngas cooler 18. The controller 26 may process sensor feedback received from the sensor 24 and may send control signals to the valve 28 based on the sensor feedback. The valve 28 may be used to control the flow of the pre-AGR syngas 119. In some embodiments, the controller 26 may send control signals to the compressor 114 and the heater 118 to obtain the desired the pressure and temperature of the pre-AGR syngas.

Figure 4:
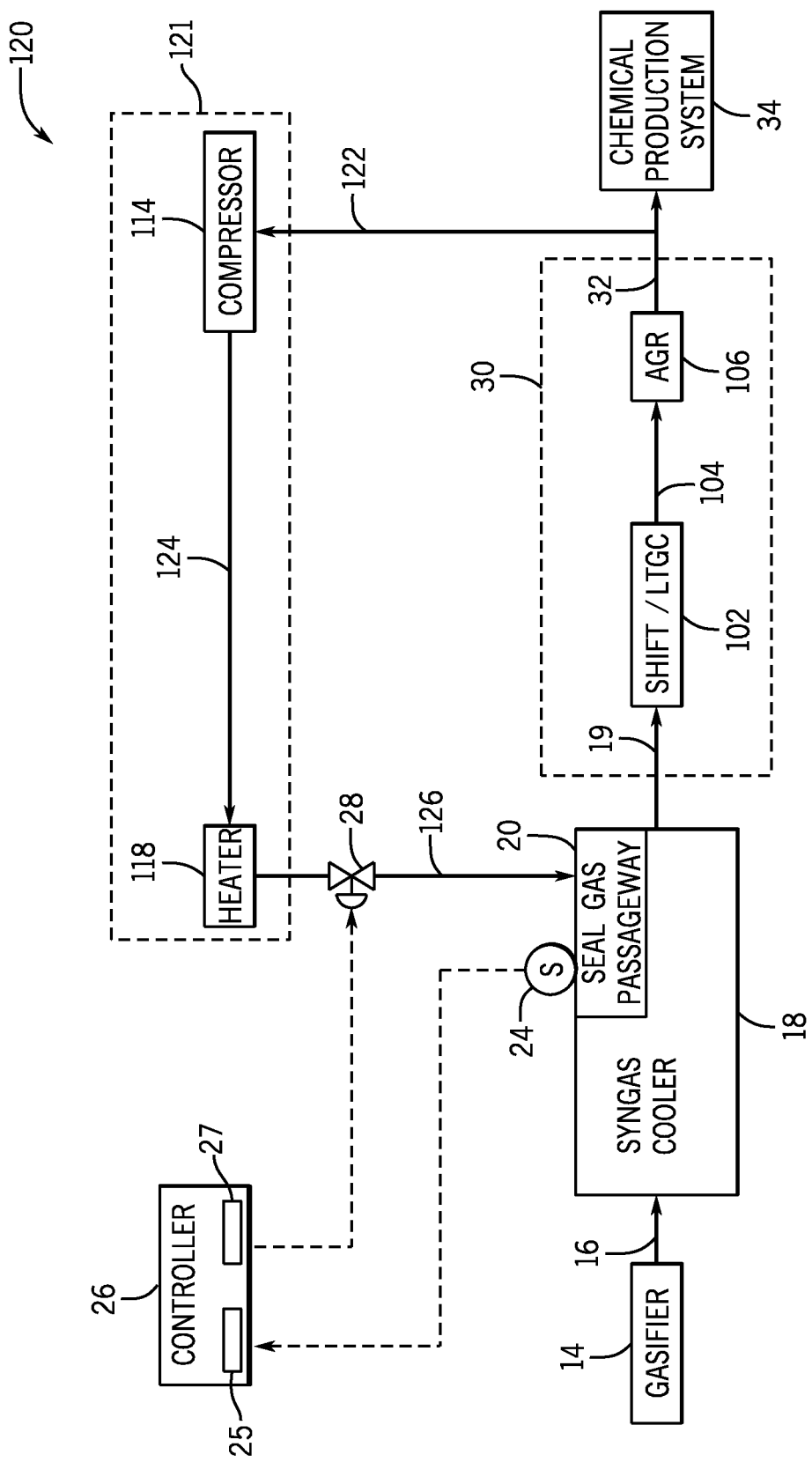
FIG. 4 is a block diagram of an embodiment of a gasification system incorporating a compatible seal gas system to supply post-AGR syngas as a seal gas.

FIG. 4 is a block diagram of an embodiment of a gasification system 120 incorporating a compatible seal gas system 121 using post-AGR syngas (e.g., syngas obtained downstream of the AGR) as the seal gas for the syngas cooler 18. The gasification system 120 and the compatible seal gas system 121 include similar components to the gasification system 100 and the compatible seal gas system 101 of FIG. 3, and accordingly, will be discussed in a similar manner with respect to FIG. 3 using the same reference numerals for the same elements.

As described above, the gasifier 14 may produce the syngas 16, which may be cooled by the syngas cooler 18. The cooled syngas 19 may be transferred from the syngas cooler 18 to the syngas treatment system 30, which may include the shift/LTGC unit 102 and the AGR unit 106.

In the depicted embodiment, a portion of the treated syngas 32, e.g., a post-AGR syngas 122, may be provided to the compatible seal system 121 for supply to the syngas cooler 18 as the seal gas. As noted above, the post-AGR syngas 122 may be substantially free of carbon dioxide and acid gas such as hydrogen sulfide ($H_2S$) and carbonyl sulfide (COS). For example, the post-AGR syngas 122 may also include less than approximately 0.015 ppm, or 0.01 ppm, or 0.005 ppm carbon dioxide, or by volume, less than approximately 5%, 4%, 3%, 2% or 1%. The post-AGR syngas 122 may include less than approximately 0.015 ppm, or 0.01 ppm, or 0.005 ppm hydrogen sulfide ($H_2S$) and/or carbonyl sulfide (COS), or by volume, less than approximately 5%, 4%, 3%, 2% or 1%. In some embodiments, the post-AGR syngas 122 may include, in mole fractions, approximately 99% syngas and 1% other gases including, for example, argon. In certain embodiments, the exact composition of the post-AGR syngas 122 will vary depending on, among other factors, the gasification process, shift reactions, and AGR efficiency.

Before transferring the post-AGR syngas 122 to the seal gas passageway 20 of the syngas cooler 18 for use as the seal gas, the post-AGR syngas 122 may be pressurized and heated, similar to the pre-AGR syngas 112 in FIG. 3. In the depicted embodiment, the post-AGR syngas 122 may be transferred to the compressor 114 to be pressurized. For example, a pressurized post-AGR syngas 124 may have a pressure between approximately 30 to 100 bar, 40 to 90 bar, 50 to 80 bar, or 60 to 70 bar. By further example, the pressurized post-AGR syngas 124 may have a pressure of approximately 65 bar.

In the depicted embodiment, the pressurized post-AGR syngas 124 may be transferred to the heater 118 to be heated. For example, a heated post-AGR syngas 126 may have a temperature between approximately 250 to 400° C., 270 to 380° C., 290 to 360° C., or 310 to 330° C. By further example, the heated post-AGR syngas 126 may have a temperature of approximately 320° C. In some embodiments, the post-AGR syngas 122 may be heated first by the heater 118 before being pressurized by the compressor 114.

Figure 5:
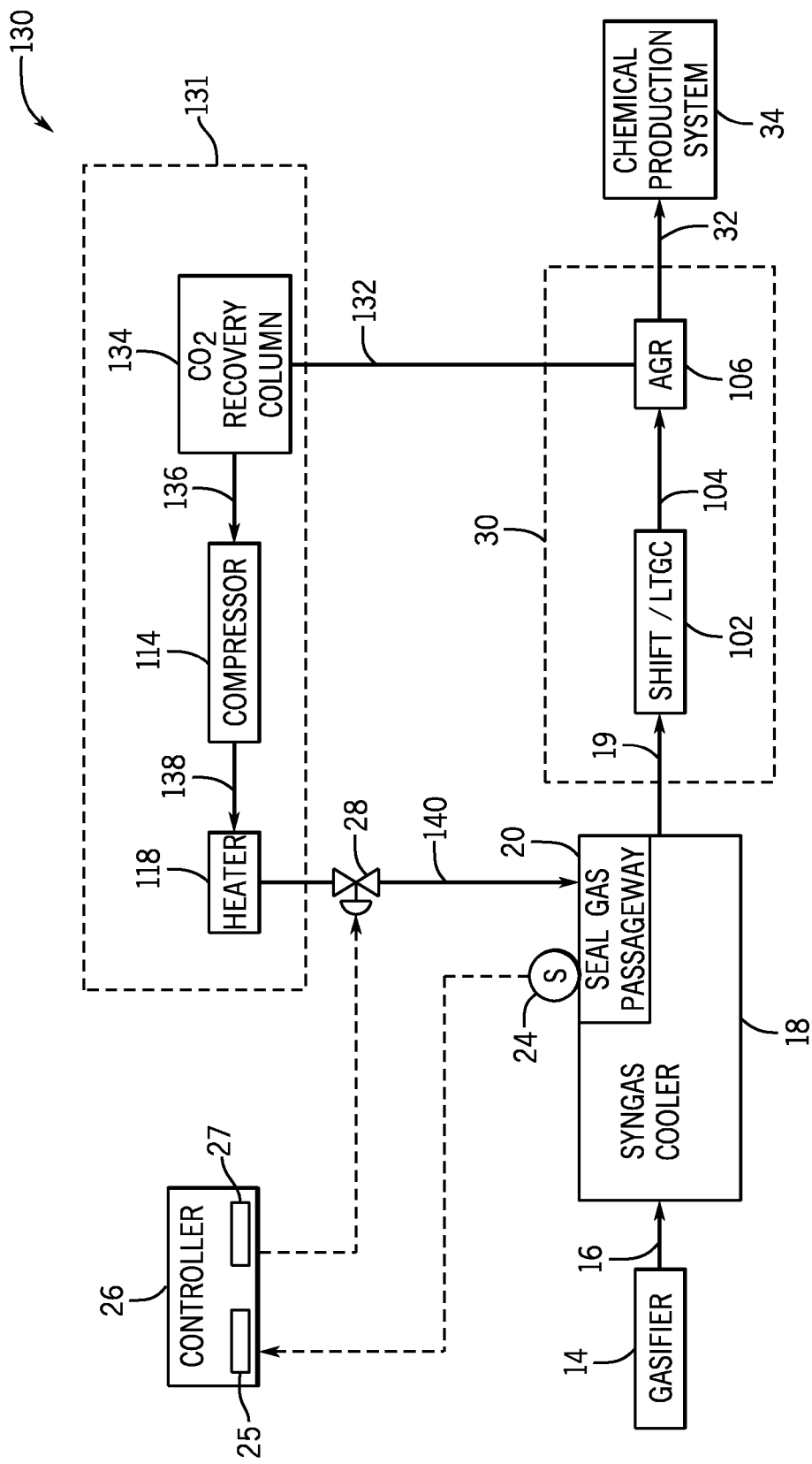
FIG. 5 is a block diagram of an embodiment of a gasification system incorporating a compatible seal gas system to supply carbon dioxide as a seal gas.

FIG. 5 is a block diagram of an embodiment of a gasification system 130 incorporating a compatible seal gas system 131 using carbon dioxide (e.g., $CO_2$ that is at least 70, 80, 90, 95, 96, 97, 98, 99% pure by volume) as the seal gas for the syngas cooler 18. The gasification system 130 and the compatible seal gas system 131 include similar components to the gasification system 100 and the compatible seal gas system 101 of FIG. 3, and accordingly, will be discussed in a similar manner with respect to FIG. 3 using the same reference numerals for the same elements.

As described above, the gasifier 14 may produce the syngas 16, which may be cooled by the syngas cooler 18. The cooled syngas 19 may be transferred from the syngas cooler 18 to the syngas treatment system 30, which may include the shift/LTGC unit 102 and the AGR unit 106.

As noted above, the AGR unit 106 may include a carbon capture system and thereby separates carbon dioxide 132 from the syngas 104. In the depicted embodiment, carbon dioxide 132 separated from the syngas that undergoes the treatment in the AGR unit 106 may be provided to the compatible seal system 121 to supply to the syngas cooler 18 as the seal gas. The compatible seal gas system 131 includes a $CO_2$ recovery column 134 to capture and/or purify carbon dioxide from the syngas 104. In some embodiments, the $CO_2$ recovery column 134 may be a part of the AGR unit 106. As noted above, carbon dioxide 132 (or carbon dioxide 136 coming out of the $CO_2$ recovery column 134) may be substantially free of acid gas such as hydrogen sulfide ($H_2S$) and carbonyl sulfide (COS). For example, carbon dioxide 132 (or carbon dioxide 136) may include less than approximately 0.015 ppm, or 0.01 ppm, or 0.005 ppm hydrogen sulfide ($H_2S$) and/or carbonyl sulfide (COS), or by volume, less than approximately 5%, 4%, 3%, 2% or 1%.

Before transferring carbon dioxide 136 to the seal gas passageway 20 of the syngas cooler 18 for use as the seal gas, carbon dioxide 136 may be pressurized and heated, similar to the pre-AGR syngas 112 in FIG. 3 and the post-AGR syngas 122 in FIG. 4. In the depicted embodiment, carbon dioxide 136 may be transferred to the compressor 114 to be pressurized. For example, a pressurized carbon dioxide 138 may have a pressure between approximately 30 to 100 bar, 40 to 90 bar, 50 to 80 bar, or 60 to 70 bar. By further example, the pressurized carbon dioxide 138 may have a pressure of approximately 65 bar.

In the depicted embodiment, the pressurized carbon dioxide 138 may be transferred to the heater 118 to be heated. For example, a heated carbon dioxide 140 may have a temperature between approximately 250 to 400° C., 270 to 380° C., 290 to 360° C., or 310 to 330° C. By further example, the heated carbon dioxide 140 may have a temperature of approximately 320° C. In some embodiments, carbon dioxide 136 may be heated first by the heater 118 before being pressurized by the compressor 114.

Figure 6:
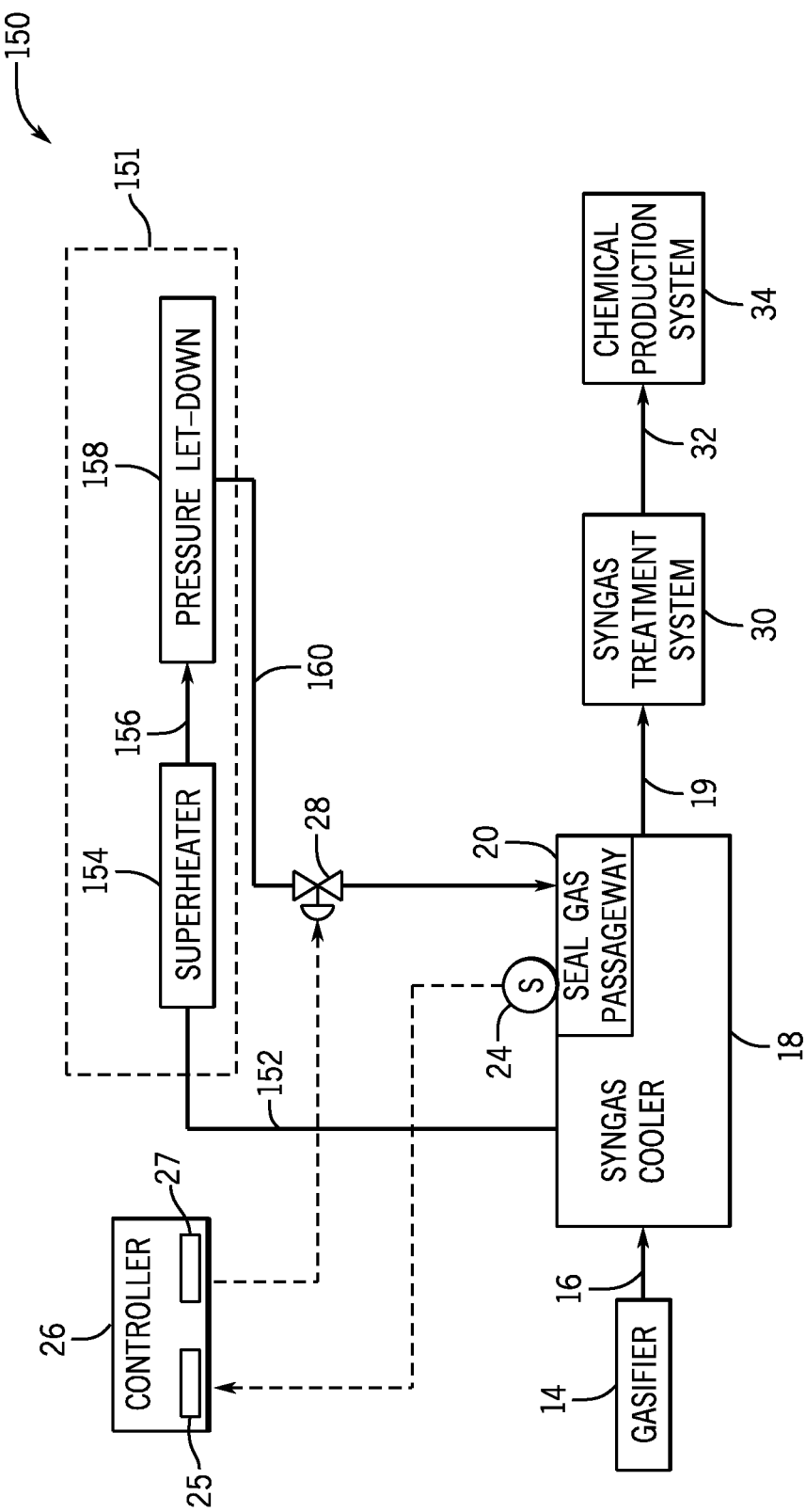
FIG. 6 is a block diagram of an embodiment of a gasification system incorporating a compatible seal gas system to supply steam as a seal gas.

FIG. 6 is a block diagram of an embodiment of a gasification system 150 incorporating a compatible seal gas system 151 using steam as the seal gas for the syngas cooler 18. The gasification system 150 includes similar components to the gasification system 100 of FIG. 1, and accordingly, will be discussed in a similar manner with respect to FIG. 1 using the same reference numerals for the same elements.

As described above, the gasifier 14 may produce the syngas 16, which may be cooled by the syngas cooler 18. Steam 152 may be generated by the syngas cooler 18 from the heat exchange between the hot syngas 16 and the liquid coolant (e.g., water) used for cooling the syngas inside the tube cage. In the depicted embodiment, the steam 152 may be provided to the compatible seal system 151 for supply to the syngas cooler 18 as the seal gas. In certain embodiments, the steam 152 may be generated from some units integrated into and/or independent of the gasification system 150, including a boiler, a steam drum, a steam turbine, or a heat recovery steam generator (HRSG), or any combination thereof.

As illustrated, the compatible seal gas system 151 may include a superheater 154 and a pressure let-down 158. The steam 152 may be transferred to the superheater 154 to be superheated (e.g., heated above its vaporization point at the absolute pressure where a temperature measurement is taken). For example, a superheated steam 156 may have a temperature between approximately 250 to 400° C., 270 to 380° C., 290 to 360° C., or 310 to 330° C. By further example, the heated steam 156 may have a temperature of approximately 320° C.

In the depicted embodiment, the superheated steam 156 may be transferred to the pressure let-down 158 where the pressure of the heated steam 156 may be decreased. For example, a depressurized steam 160 may have a pressure between approximately 30 to 100 bar, 40 to 90 bar, 50 to 80 bar, or 60 to 70 bar. By further example, the depressurized steam 160 may have a pressure of approximately 65 bar. In some embodiments, the valve 28 may be used to reduce the pressure of the superheated steam 156, and accordingly, no separate pressure let-down 158 may be used. In certain embodiments, the steam 152 generated from the syngas cooler 18 may be depressurized first by the pressure let-down 158 before being heated by the superheater 154.

FIG. 7 is a process flow diagram of an embodiment of a method 170 for providing a compatible seal gas to the syngas cooler 18. In some embodiments, some steps may be modified, excluded, or additional steps may be included. The method 170 begins by producing the syngas 16 in the gasifier 14 (step 172). The syngas 16 from the gasifier 14 may then be cooled in the syngas cooler 18 (step 176). As noted above, the syngas 16 may contain acid gases, such as hydrogen sulfide ($H_2S$) and carbonyl sulfide (COS), which are corrosive and may negatively affect the tube cage or other parts of the syngas cooler 18 if they migrate into the annulus 20. The compatible seal gas may flow into and purge the annulus 20 to reduce or eliminate such negative effects (e.g., corrosion). The compatible seal gas may be supplied by the compatible seal gas system, where the seal gas may be processed to desired temperature and pressure for sealing the syngas cooler 18 (step 180).

Steam 152 may be generated by the syngas cooler 18 from the heat exchange between the hot syngas 16 and the coolant (step 178). In some embodiments, this steam may be provided to the compatible gas system (as indicated by arrow 174), and after being processed to the desired temperature and pressure, the steam may be transferred to the syngas cooler used as the seal gas (step 180).

The cooled syngas 19 coming out of the syngas cooler 18 may be transferred from the syngas cooler to the syngas treatment system 30 where the syngas may be treated to remove impurities, such as carbon dioxide, particulates, and acid gases (step 184). In present embodiments, the syngas treatment system 30 may include the shift/LTGC 102 and the AGR unit 106. In some embodiments, a portion of the post-AGR syngas 122 may be provided to the compatible seal gas system 12 to be used as the seal gas for the syngas cooler 18 (as indicated by 186). In other embodiments, some gas coming out of the syngas treatment process by the syngas treatment system 30 may also be used as seal gas for the syngas cooler 18 (as indicated by 188), such as the pre-AGR syngas 108, and carbon dioxide 132 separated by the AGR 106. The compatible seal gas system may process such compatible gases to desired temperatures and pressures (step 180), and then transfer the compatible gases to the syngas cooler 18 for use as the seal gas.

The treated syngas 32 from the syngas treatment system 30 may then enter the chemical production system 34 to produce any of a variety of chemicals, such as methanol, ammonia, hydrogen, or acetic acid (step 190). As noted above, without the disclosed embodiments, nitrogen may be used as the seal gas for the syngas cooler 18, may exit the syngas cooler 18 together with the syngas 19 and thereby may constitute an impurity of the syngas 19 for chemical production applications. In accordance with the present disclosure, compatible gas may be used as the seal gas for the syngas cooler 18, thereby eliminating or reducing the removal of nitrogen impurities for chemical production applications of the syngas 19.

Technical effects of the invention include using compatible gas as a seal gas for sealing an annulus of a syngas cooler. The syngas 16 produced by the gasifier 14 may contain acid gases, such as hydrogen sulfide ($H_2S$) and carbonyl sulfide (COS). Without the disclosed embodiments, such acid gases may migrate into the annulus 20 of the syngas cooler 18 resulting in corrosion of the internal parts of the syngas cooler 18. Purging the annulus with seal gases may help with reducing or eliminating the corrosion caused by the acid gases. Without the disclosed embodiments, nitrogen may be used as the syngas cooler seal gas, and thus may introduce impurities to the downstream chemical production system 34. Advantageously, compatible gas produced from the gasification process (or elsewhere) may be used as the syngas cooler seal gas. Such compatible gas may include the pre-AGR syngas 108, the post-AGR syngas 122, carbon dioxide 132 separated by the AGR 106, and the steam 152 generated from the syngas cooler. The use of such compatible gas may also be controlled by one or more controllers coupled with one or more sensors, e.g., for monitoring the temperature, pressure, flow rate, and composition.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a syngas cooler configured to cool a syngas, wherein the syngas cooler comprises a seal configured to block the syngas from a passage between an outer wall of the syngas cooler and a tube cage of the syngas cooler;
   a compatible seal gas system configured to supply a compatible seal gas to the seal of the syngas cooler, wherein the compatible seal gas system comprises a hydrogen sulfide absorber;
   a syngas treatment system configured to be fluidly coupled to the syngas cooler and the compatible seal gas system, wherein the syngas treatment system is configured to receive the syngas and generate a partially treated syngas, wherein the syngas treatment system comprises an acid gas removal (AGR) system configured to remove an acid gas from the partially treated syngas to generate a treated syngas; and
   a flow path extending from the syngas treatment system to the compatible seal gas system, wherein the flow path is configured to supply at least a portion of the partially treated syngas to the hydrogen sulfide absorber of the compatible seal gas system, wherein the hydrogen sulfide absorber is configured to remove hydrogen sulfide from the portion of the partially treated syngas and to generate the compatible seal gas.

2. The system of claim 1, further comprising:
   a gasifier configured to generate the syngas from partial oxidation of a fuel and an oxidant; and
   a chemical production system disposed downstream from and fluidly coupled to the syngas treatment system, wherein the chemical production system is configured to generate a chemical product from a chemical reaction with the treated syngas.

3. The system of claim 1, wherein the syngas treatment system comprises a shift reactor configured to perform a water-gas-shift reaction of the syngas to produce the partially treated syngas comprising a shifted syngas, and wherein the flow path is configured to fluidly couple the shift reactor and the compatible seal gas system such that the compatible seal gas system receives and supplies at least a portion of the shifted syngas as the compatible seal gas to the seal.

4. The system of claim 3, wherein the compatible seal gas system comprises:
   a compressor configured to increase a pressure of the portion of the shifted syngas; and
   a heater configured to increase a temperature of the portion of the shifted syngas.

5. The system of claim 1, wherein the AGR system and the compatible seal gas system are fluidly coupled such that the compatible seal gas system receives and supplies a portion of the treated syngas as the compatible seal gas to the seal, and the compatible seal gas system comprises a compressor configured to increase a pressure of the portion of the treated syngas.

6. The system of claim 1, wherein the syngas cooler is configured to generate steam from cooling the syngas, and the compatible seal gas system is configured to receive the steam from the syngas cooler via a steam flow path extending between a steam source in the syngas cooler and the compatible seal gas system and to supply the steam as the compatible seal gas to the seal.

7. The system of claim 6, wherein the compatible seal gas system comprises:
   a superheater configured to superheat the steam from the syngas cooler to produce a superheated steam; and
   a pressure let-down device configured to decrease a pressure of the superheated steam supplied to the seal as the compatible seal gas.

8. The system of claim 1, comprising at least one of a boiler, a steam drum, a steam turbine, or a heat recovery steam generator (HRSG), or any combination thereof, configured to generate steam as the compatible seal gas.

9. The system of claim 1, wherein the syngas treatment system comprises a carbon capture system configured to separate carbon dioxide from the syngas, and wherein the compatible seal gas system is configured to receive and to supply at least a portion of the carbon dioxide as the compatible seal gas to the seal, and the compatible seal gas system comprises a compressor configured to increase a pressure of the portion of the carbon dioxide.

10. The system of claim 1, comprising:
    a controller programmed to control the syngas cooler and the compatible seal gas system, wherein the controller comprises:
      one or more tangible, non-transitory, machine-readable media collectively storing one or more sets of instructions; and
      one or more processing devices configured to execute the one or more sets of instructions to:

control the syngas cooler to cool the syngas, and to block the syngas from entering the passage between the outer wall of the syngas cooler and the tube cage of the syngas cooler using the seal disposed in the syngas cooler; and
control the compatible seal gas system to supply the compatible seal gas to the seal.

11. The system of claim 1, wherein the AGR system comprises a carbon capture system configured to generate at least a portion of the compatible seal gas, wherein the portion of the compatible seal gas comprises carbon dioxide.

* * * * *